(12) United States Patent
Liu et al.

(10) Patent No.: US 12,033,160 B2
(45) Date of Patent: Jul. 9, 2024

(54) IDENTIFICATION OF RELATED INCIDENT RETRIEVAL BASED ON TEXTUAL AND CONTEXTUAL DATA

(71) Applicant: International Business Machines Corporation, Armonk, NY (US)

(72) Inventors: Zhe Liu, San Jose, CA (US); Rupaningal Sarasi Sarangi Lalithsena, San Jose, CA (US); Haibin Liu, San Jose, CA (US); Rama Kalyani T. Akkiraju, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/905,213

(22) Filed: Jun. 18, 2020

(65) Prior Publication Data

US 2021/0398137 A1    Dec. 23, 2021

(51) Int. Cl.
| | |
|---|---|
| *G06Q 30/016* | (2023.01) |
| *G06F 16/33* | (2019.01) |
| *G06F 40/30* | (2020.01) |
| *G06N 5/04* | (2023.01) |
| *G06N 20/00* | (2019.01) |
| *G06Q 10/20* | (2023.01) |
| *G06F 40/205* | (2020.01) |

(52) U.S. Cl.
CPC ....... *G06Q 30/016* (2013.01); *G06F 16/3347* (2019.01); *G06F 40/30* (2020.01); *G06N 5/04* (2013.01); *G06N 20/00* (2019.01); *G06Q 10/20* (2013.01); *G06F 40/205* (2020.01)

(58) Field of Classification Search
CPC .. G06Q 30/016; G06Q 10/20; G06F 16/3347; G06F 40/30; G06F 40/205; G06N 5/04; G06N 20/00
See application file for complete search history.

(56) References Cited

U.S. PATENT DOCUMENTS

| | | | |
|---|---|---|---|
| 7,669,085 B2 * | 2/2010 | Alam | H04W 24/00 |
| | | | 714/43 |
| 8,365,019 B2 | 1/2013 | Sailer et al. | |

(Continued)

FOREIGN PATENT DOCUMENTS

AU    2020270417 B2 *    3/2023    ........... G06F 16/353

OTHER PUBLICATIONS

Analytics for similarity matching of IT cases (Year: 2011).*

(Continued)

*Primary Examiner* — Sangeeta Bahl
(74) *Attorney, Agent, or Firm* — Jared C. Chaney

(57) ABSTRACT

A computer-implemented method for accurately identifying related incidents using textual data and contextual data includes receiving incident data associated with a computing system, wherein the incident data further comprises textual data and contextual data associated with the incident data. One or more relevant incidents associated with the received incident data is identified by applying an artificial intelligence model on the textual data associated with the received incident data. The identified one or more relevant incidents associated with the received incident data is provided to a site engineer device and the provided one or more relevant incidents is resolved.

20 Claims, 7 Drawing Sheets

(56) References Cited

U.S. PATENT DOCUMENTS

| | | | | |
|---|---|---|---|---|
| 8,996,397 | B2* | 3/2015 | Grace | G06Q 10/10 |
| | | | | 705/7.29 |
| 9,317,829 | B2 | 4/2016 | Anand et al. | |
| 10,977,293 | B2* | 4/2021 | Cai | G06F 16/3329 |
| 2014/0358610 | A1* | 12/2014 | de Assuncao | G06Q 10/0639 |
| | | | | 705/7.15 |
| 2018/0005286 | A1* | 1/2018 | Grabarnik | G06Q 30/0613 |
| 2019/0108486 | A1* | 4/2019 | Jain | G06N 3/0445 |
| 2019/0132191 | A1* | 5/2019 | Mann | G06F 11/30 |
| 2019/0325323 | A1* | 10/2019 | Walthers | G06N 20/00 |
| 2019/0347282 | A1* | 11/2019 | Cai | G06F 3/0482 |
| 2020/0110823 | A1 | 4/2020 | Steuer | |
| 2020/0210924 | A1* | 7/2020 | Ghosh | G06N 5/022 |
| 2020/0409715 | A1* | 12/2020 | Balasubramanian | |
| | | | | G06F 11/3065 |

OTHER PUBLICATIONS

Munteanu et al. Cloud Incident Management, Challenges, Research Directions, and Architectural Approach. UCC '14: Proceedings of the 2014 IEEE/ACM 7th International Conference on Utility and Cloud Computing, Dec. 2014 pp. 786-791.

Lou, J. G., Lin, Q., Ding, R., Fu, Q., & Xie, T.. (2013). Software analytics for incident management of online services: An experience report. IEEE/ACM International Conference on Automated Software Engineering. ACM.

Mikolov, T. (2013). Distributed representations of words and phrases and their, compositionality. Advances in Neural Information Processing Systems, 26, 3111-3119.

Perozzi, Bryan, Al-Rfou, Rami, & Skiena, Steven. Deepwalk: online learning of social representations. KDD '14: Proceedings of the 20th ACM SIGKDD international conference on Knowledge discovery and data mining, Aug. 2014 pp. 701-710.

Hardoon, David R., Szedmak, Sandor, & Shawe-Taylor, John. . Canonical correlation analysis: an overview with application to learning methods. Neural Computation, 16(12), 2639-2664. 2004.

Zhen Wang, Jianwen Zhang, Jianlin Feng, & Zheng Chen. (2014). Knowledge Graph and Text Jointly Embedding. Proceedings of the 2014 Conference on Empirical Methods in Natural Language Processing (EMNLP).

Ganguly, S., & Pudi, V.. (2017). Paper2vec: combining graph and text information for scientific paper representation.

Gupta, Rajeev, et al., "Automating ITSM Incident Management Process," 2008 International Conference on Autonomic Computing, pp. 141-150, IEEE.

Yun, Mingchun, et al., "Automate Incident Management by Decision-making Model," 2017 IEEE 2nd International Conference on Big Data Analysis (ICBDA), pp. 217-222, IEEE.

"Optimal Solution to Identify the Recurring Incidents in Service Management," IP.com No. IPCOM000244694D, Jan. 6, 2016, 6 pages.

* cited by examiner

| Number △ | Parent Incident | Short Description | Description | Close Notes |
|---|---|---|---|---|
| INC0378332 | Search | Search | Search | Search |
| | | Port-channel flaps bcs08a/b.sr01.dal08 | Rack switch pair bcs08a.sr01.dal08 andbc.... | Resolved automatically |

| INC0378332 | INC029507 |
|---|---|

FIG. 7

IDENTIFICATION OF RELATED INCIDENT RETRIEVAL BASED ON TEXTUAL AND CONTEXTUAL DATA

TECHNICAL FIELD

The present application generally relates to incident management, and more particularly, to accurately identifying related incidents using textual and contextual data and devices thereof.

BACKGROUND

As more and more organizations and businesses are moving their services online or to the cloud, incident management has become essential to delivering compelling customer experiences. An incident is defined as an anomalous event that causes a reduction or interruption of the quality of a service, which may lead to service shortage or delay. Incident management is the process adopted by Site Reliable Engineers (SREs) to respond to the unplanned event and to restore services being interrupted back to their normal states. Ideally, incident management should be conducted through monitoring and analyzing large amounts of data collected from multi-sources (e.g. logs, metrics, etc.) across services to allow the SREs to better understand the problem and to further identify the root cause. However, such a process consumes a huge amount of time. So, in practice, when a new incident occurs, SREs usually first search its symptoms and customer impacts against the historical incidents and quickly determine if the new incident is similar or related to a previous one. If a related incident is found, then they can immediately restore the service by leveraging the documented resolution of the identified related incident. More detailed root cause analysis can be performed after the service restoration.

Given that an incident may be caused by issues across many different components or even layers, searching for related incident just based on symptom or customer impact may not be able to capture the full context of an incident, including its upstream causes and downstream effects. For example, for a new incident "INC0003805" with description "NLU services down in Tokyo", related incidents may include upstream causes such as "INC0001731—Consumers in jp-tok are getting errors from TAM", "INC0002001—DB2 are unavailable in Tokyo", and "INC0002822—Network connectivity disruption in JP". Just by retrieving for related incidents based on textual descriptions may easily miss many of these contextually dependent incidents.

Accordingly, there is a requirement to accurately identifying related incident using textual data and contextual data.

SUMMARY

Embodiments provide a computer-implemented method for accurately identifying related incident using textual data and contextual data includes receiving incident data associated with a computing system, wherein the incident data further comprises textual data and contextual data associated with the incident data. One or more relevant incidents associated with the received incident data is identified by applying an artificial intelligence model on the textual data associated with the received incident data. The identified one or more relevant incidents associated with the received incident data is provided to a site engineer device and the provided one or more relevant incidents is resolved.

In another embodiment, one or more historical incidents and the artificial intelligence model is trained using the obtained one or more historical incidents prior to receiving incident data.

In another embodiment, the received incident data is converted into a vector representation.

In yet another embodiment, the identified one or more relevant incidents are represented as a dependency graph.

In another embodiment, the received incident data and the one or more historical incidents is represented in a graphical representation.

In another embodiment, the textual data comprises a textual description of the received incident and the contextual data comprises data provided by the site engineer device associated with the received incident.

In another illustrative embodiment, a non-transitory computer readable medium comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a full question generation processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 7 is an exemplary image illustrating an example of identified related incidents.

DETAILED DESCRIPTION OF EXEMPLARY EMBODIMENTS

The present invention may be a system, a method, and/or a computer program product for efficiently representing and storing data in a graph data structure using artificial intelligence (AI). The computer program product may include a computer-readable storage medium (or media) having computer-readable program instructions thereon for causing a processor to carry out aspects of the present invention.

Figure 1:
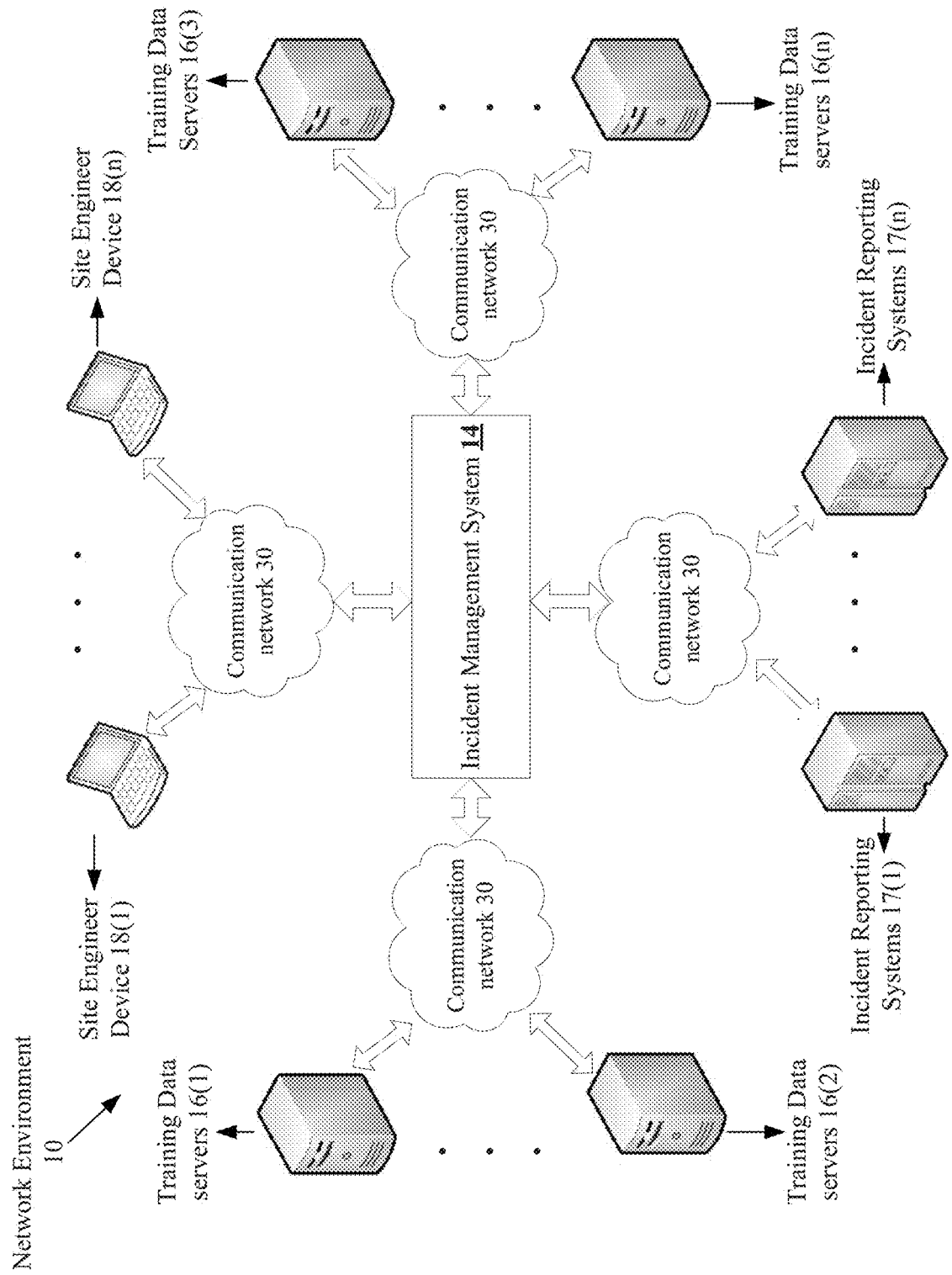
FIG. 1 is an example of a block diagram of a network environment 10 including an incident management system 14 for accurately identifying related incident using textual and contextual data.
Figure 2:
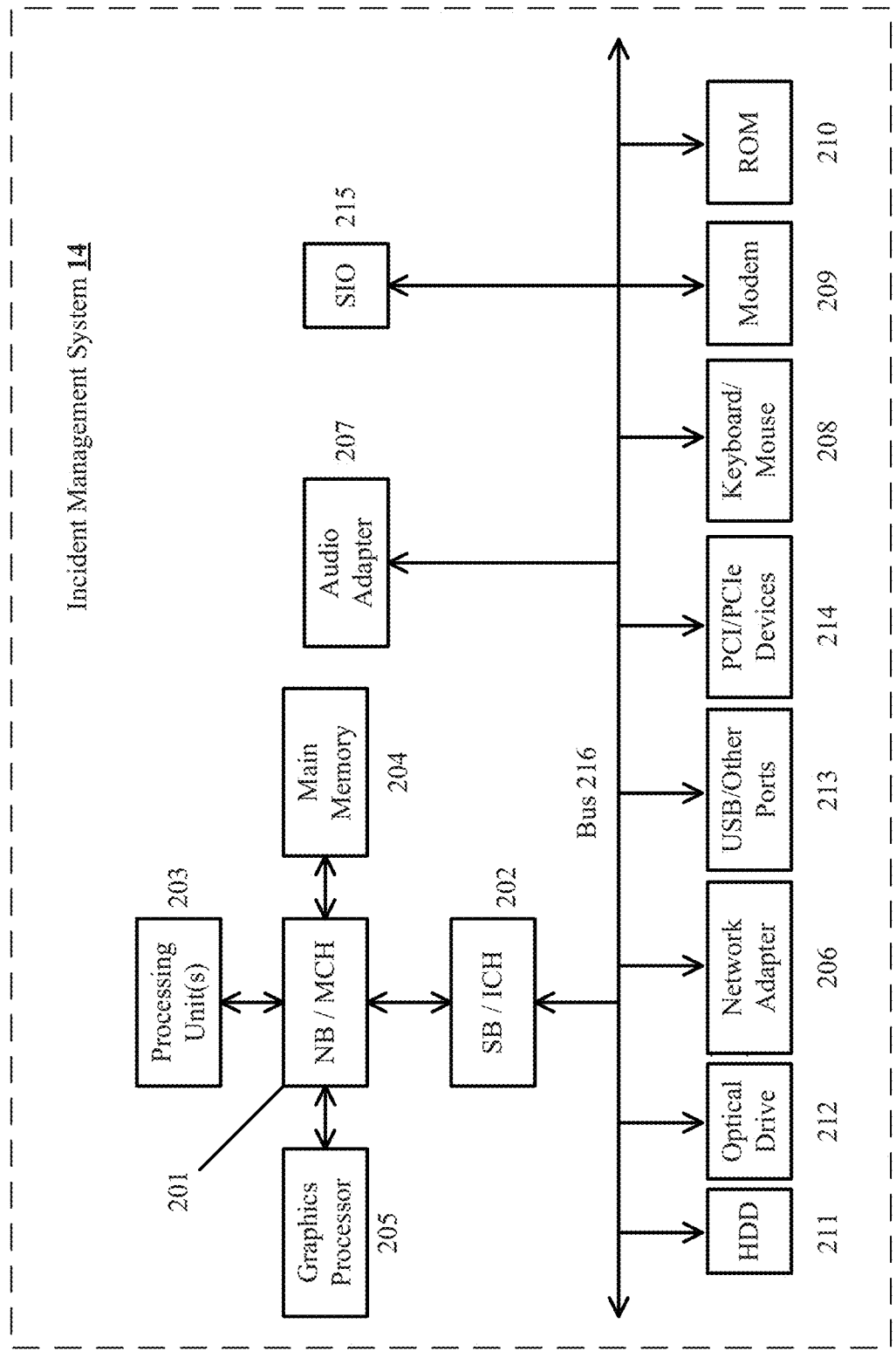
FIG. 2 is an example of a block diagram of an incident management system 14.
Figure 3:
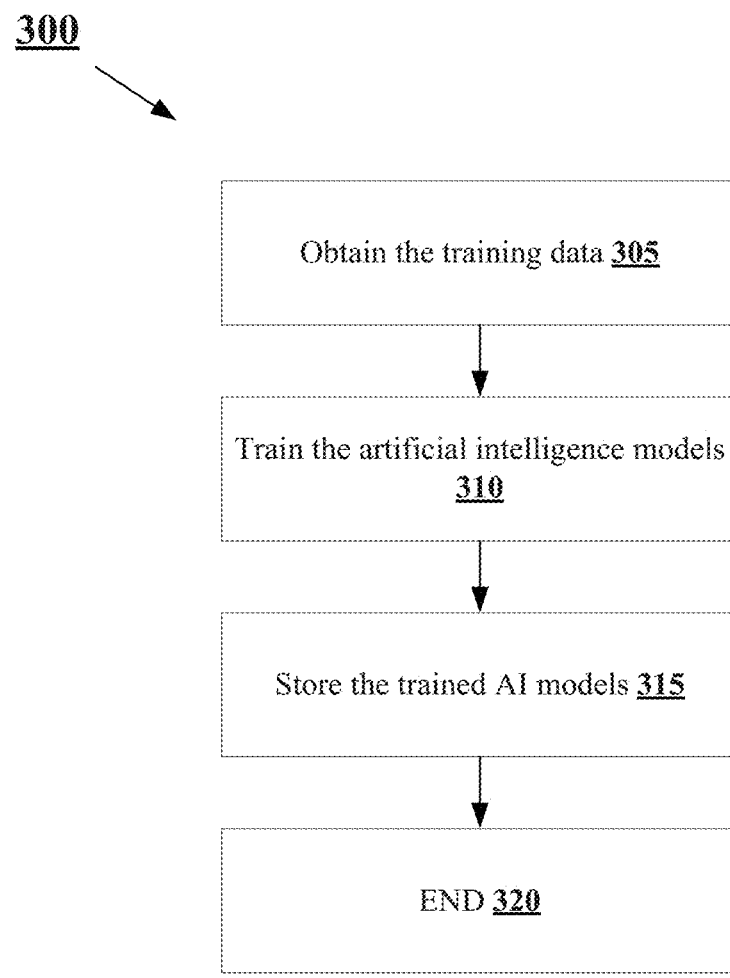
FIG. 3 is an exemplary flowchart illustrating a method 300 for training artificial intelligence (AI) models.

A network environment 10 with an example of an incident management system 14 is illustrated in FIGS. 1-2. In this particular example, the environment 10 includes the incident management system 14, one or more training data servers 16(1)-16(n), one or more incident reporting systems 17(1)-17(n), and one or more site engineer devices 18(1)-18(n) coupled via one or more communication networks 30, although the environment could include other types and numbers of systems, devices, components, and/or other elements as is generally known in the art and will not be illustrated or described herein. This technology provides a number of advantages including providing methods, non-transitory computer readable medium, and systems that accurately identifies related incident using textual and contextual data.

Referring more specifically to FIGS. 1-2, the incident management system 14 is programmed to accurately identify related incident using textual and contextual data. Now referring to FIG. 2, the incident management system 14 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read-only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH.

An operating system can run on processing unit 203. The operating system can coordinate and provide control of various components within the incident management system 14. As a client, the operating system can be a commercially available operating system. An object-oriented programming system, such as the Java™ programming system, may run in conjunction with the operating system and provide calls to the operating system from the object-oriented programs or applications executing on the data processing system. As a server, the incident management system 14 can be an IBM® eServer™ System p® running the Advanced Interactive Executive operating system or the Linux operating system. The incident management system 14 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the full question generation system can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. For example, the incident management system 14 includes several components that would not be directly included in some embodiments illustrated in FIGS. 3-7. However, it should be understood that the embodiments illustrated in FIGS. 3-7 may include one or more of the components and configurations of the incident management system 14 for performing processing methods and steps in accordance with the disclosed embodiments.

Moreover, other internal hardware or peripheral devices, such as flash memory, equivalent non-volatile memory, or optical disk drives may be used in addition to or in place of the hardware depicted. Moreover, the incident management system 14 can take the form of any of a number of different data processing systems, including but not limited to, client computing devices, server computing devices, tablet computers, laptop computers, telephone or other communication devices, personal digital assistants, and the like. Essentially, incident management system 14 can be any known or later developed data processing system without architectural limitation.

Referring back to FIG. 1, each of the one or more training data servers 16(1)-16(n) may store and provide training data to the incident management system 14 via one or more of the communication networks 30, for example, although other types and/or numbers of storage media in other configurations could be used. In this particular example, each of the one or more training data servers 16(1)-16(n) may comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the plurality of training data servers 16(1)-16(n) and may transmit data in response to requests from the incident management system 14. Each of the one or more training data servers 16(1)-16(n) may include a processor, a memory, and a communication interface, which are coupled together by a bus or other link, although each may have other types and/or numbers of other systems, devices, components, and/or other elements.

Additionally, each of the one or more incident reporting systems 17(1)-17(n) may store and report incidents to the incident management system 14 via one or more of the communication networks 30, for example, although other types and/or numbers of storage media in other configurations could be used. In this particular example, each of the one or more incident reporting systems 17(1)-17(n) may comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the one or more of incident reporting systems 17(1)-17(n) and may transmit data in response to requests from the incident management system 14. Each of the one or more incident reporting systems 17(1)-17(n) may include a processor, a memory, and a communication interface, which are coupled together by a bus or other link, although each may have other types and/or numbers of other systems, devices, components, and/or other elements.

Furthermore, each of the one or more site engineer devices 18(1)-18(n) may view and store relevant incidents reported from the incident management system 14 via one or more of the communication networks 30, for example, although other types and/or numbers of storage media in other configurations could be used. In this particular example, each of the one or more site engineer devices 18(1)-18(n) may comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the one or more site engineer devices 18(1)-18(n) and may transmit data in response to requests from the incident management system 14. Each the one or more site engineer devices 18(1)-18(n) may include a processor, a memory, and a communication interface, which are coupled together by a bus or other link, although each may have other types and/or numbers of other systems, devices, components, and/or other elements.

The non-transitory computer readable storage medium can be a tangible device that can retain and store instructions for use by an instruction execution device. The non-transitory computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A non-transitory computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The non-transitory computer readable program instructions described herein can be downloaded to respective computing/processing devices from a computer readable storage medium or to an external computer or external storage device via a communication network 30, for example, the Internet, a local area network (LAN), a wide area network (WAN) and/or a wireless network. The communication network 30 may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of communication network 30, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular features or elements present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112 (f), unless the element is expressly recited using the phrase "means for."

An exemplary method for accurately identifying related incidents using textual and contextual data will now be illustrated with reference to FIGS. 3-7. Particularly with reference to FIG. 3, an exemplary method 300 for training the artificial intelligence (AI) models will now be illustrated. The exemplary method 300 begins at step 305 where the incident management system 14 obtains training data from the one or more training data servers 16(1)-16(n). In this example, the training data can include historical incidents, textual and contextual data associated with the historical incidents, although the training data can include other types or amounts of data.

Figure 4:
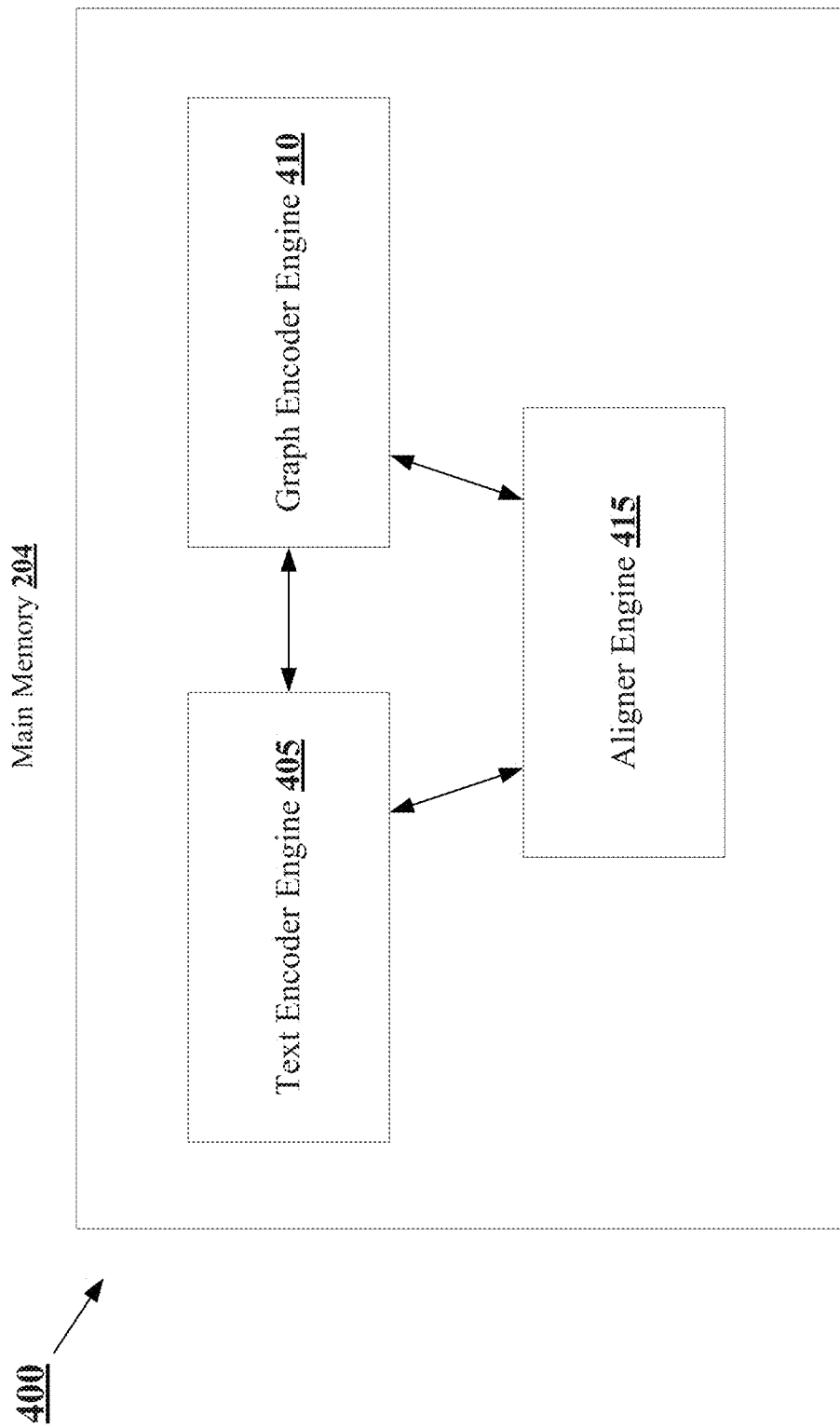
FIG. 4 is an exemplary block diagram 400 illustrating the method for training the AI models.
Figure 5:
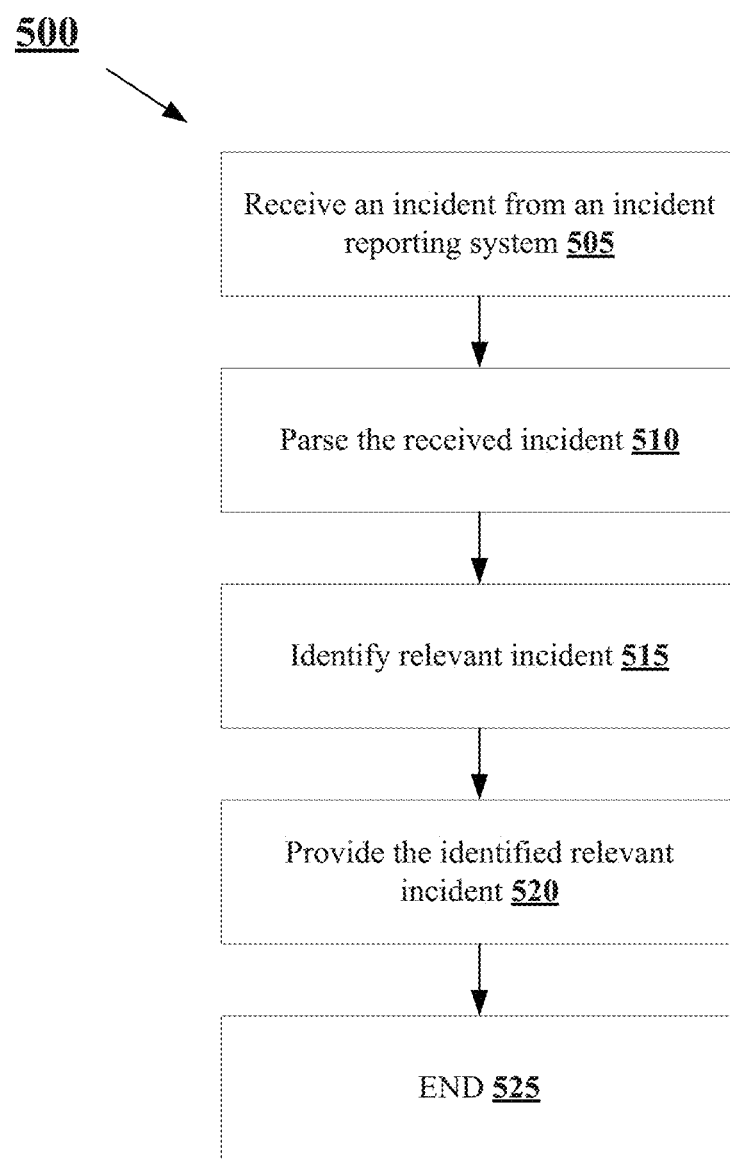
FIG. 5 is an exemplary flowchart illustrating a method 500 for accurately identifying related incident using textual and contextual data.

In step 310, the incident management system 14 trains the AI models using obtained training data which will now be illustrated using the block diagram 400 in FIG. 4. In this example, the text encoder engine 405 present within the main memory 204 of the incident management system 14 converts the textual representation of the obtained historical incidents into vector representations. In one embodiment, the text encoder engine 405 can be implemented with trained word embedded with all historical incidents, where all words will be projected into a continuous vector space $S_t$. Next, the vector representation of the incident description and customer impact can be derived by taking the sum or the average of the constituent word vectors with dimension size set to $d_t$. In addition, the AI models can be configured to encode the incident descriptions into vector representations. By way of an example, given the incident description "NLU services down in Tokyo", in one embodiment, the text encoder engine 405 will adopt a word embedding pre-trained using historical development-operations related corpus to convert each word within the incident description into a 300 dimension ($d_t$) vectors, by turning the word "NLU" into the vector [0.50451, −0.59517, . . . , −1.6106, −0.51042], word "services" into the vector [−0.022801, 0.60046, 0.41177, −2.223], etc. Next, the text encoder engine 405 will take the sum of all 5 vectors, each corresponding to a word appeared within the incident description, as the vector representation of the incident description. By turning the incidents into vector representations words with semantic similarities tend to have similar vectors (e.g. "network" and "dns") and relations between words can also be captured and maintained in the learned textual representations (e,g, the movement from "US-South" to "US-East" is the same as the movement from "LA" to "DC"), which cannot be captured by the representations such as N-gram.

Next, the graph encoder engine 410 present within the main memory 204 of the incident management system 14 converts the dependency graph between incidents into continuous vector space $S_g$. In this example, the graph encoder engine 410 first constructs an undirected graph G=(V,E) based on the dependencies between all historical incidents. In this graph, each node $V_i \in V$ represents an incident and each edge $E_i \in E$ represents a relevance between two incidents (i.e. upstream cause, downstream effects). Further, the graph encoder engine 410 learns the latent representations of vertices $\varnothing_{v_i \in v} \in \mathcal{R}^{|v|*d_g}$ in the network G, where |V| is the number of incidents within the constructed dependency graph and |V| is less than the total number of historical incidents. Further in this example, $d_g$ is the dimensionality of the learnt embedding and the value is set $d_g = d_t$ for later vector alignment. Furthermore, the technology disclosed consists of two stages, in the first stage, for each node $V_i$ within the graph, it conducts y random walks of length t to infer local structures by neighborhood relations. Then in the second stage, the technology iterates over all possible collocations of incidents in the random walks that appear within the window of size w. In this example, the technology maximizes the probability of the neighbors of $V_i$ in the given random walk $Pr(\{v_{i-w}, \ldots, v_{i-1}, v_{i+1}, \ldots, v_{i+w}\} | \emptyset_{v_i})$. By applying the disclosed technology to the incident dependency graph, incidents with similar neighbors will obtain similar latent representations.

Furthermore, the aligner engine 415 within the main memory 204 in the incident management system 14 projects $S_t$ into $S_g$ space in order to improve the textual data representation of an incident with more contextual information. This can be formed into the problem given a textual vector representation $t_i$ belongs to the source space $S_t$, and a graph vector representation $g_i$ in the target space $S_g$, learns a transformation matrix W, such that $Wt_i$ approximates $g_i$. During the training phase, in this example, in order to learn the transformation matrix W, the aligner engine 415 picks all n incidents within the graph embedding space $S_g$ (as they are a subset of incidents in $S_t$), along with their corresponding vector representations in both spaces $\{t_i, g_i\}_{i=1}^n$. The transformation matrix W can be learned by minimizing the objective function min $\Sigma_{i=1}^n \|Wt_i - g_i\|^2$. Once the transformation matrix W is learnt, the aligner engine 415 converts all incidents currently without dependent information also into graph embedding space $S_g$ by computing $g_j = Wt_j$.

Referring back to FIG. 3, in step 315, the incident management system 14 stores the trained AI models in the main memory 204, although the AI models can be stored at other memory locations and the exemplary method for training the AI models ends at step 320.

An exemplary method for accurately identifying related incident based on textual and contextual data will now be illustrated using the exemplary flowchart 500. The exemplary method begins at step 505 where the incident management system 14 receives an incident from one of the one or more incident reporting systems 17(1)-17(n). In this example, incident relates to an even that has occurred within a computing system, although incident can include other types or amounts of information.

In step 510, the incident management system 14 parses the received incident to identify the textual data associated with the received incident. In this example, the textual data describes the type of event that has occurred and data associated with the difference services that are affected by the services, although the textual data can include other types or amounts of information. For example, if the received incident is reported as INC0003805, then the incident management system 14 parses the received incident INC0003805 to identify textual data such as the description of the event that a service is Tokyo has failed. Additionally in this example, the incident management system 14 can apply natural language processing to textual data and contextual data associated with the received incident to identify and generate actionable insights.

Figure 6:
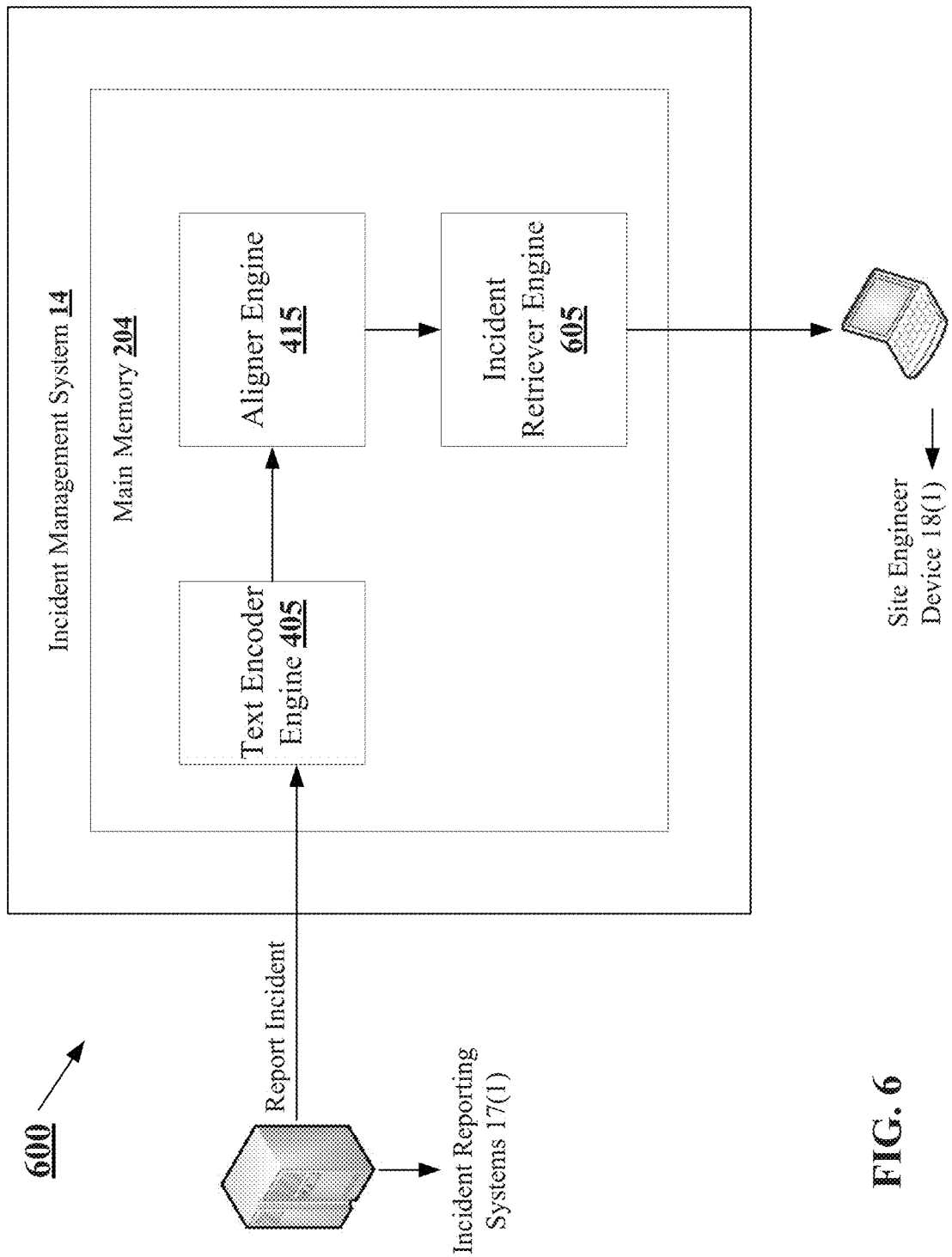
FIG. 6 is an exemplary block diagram 600 illustrating the method 500 for accurately identifying related incidents using textual and contextual data.

Next in step 515, the incident management system 14 identifies relevant incidents which will now be further illustrated using the exemplary block diagram 600 in FIG. 6. In this example, the received incident is first passed to the text encoder engine 405 with some initial descriptions and customer impacts received along with the incident parsed in step 510. In this example, the text encoder engine 405 converts the incident into a textual representation t'' based on the pre-trained embeddings (illustrated above in the flowchart 300). Next the text encoder engine 405 passes t' to the aligner engine 415, in which it will be mapped to the graph embedding space with the linear transformation based on the previously learnt transformation matrix W. Once the received incident has been converted into the graph embedding space, the incident retriever engine 605 within the main memory 204 of the incident management system 14 compares its vector representation g' with each of the representations of the historical incidents $g_j$ based on similarity measurements, such as cosine similarity, Euclidean distance, Manhattan distance, Hamming distance, or dot product distance. For faster retrieval on larger dataset, in another example, the incident retriever engine 605 can pre-indexing the vectors of all historical incidents g using methods such as Annoy, and then retrieve for the K nearest neighbors of the newly occurred incident g' based on any of the aforementioned similarity measurements. By using this technique, the disclosed technology is not only able to identify related incidents that is not only textually similar, but also contextually relevant to each another as illustrated in FIG. 7.

Referring back to FIG. 5, in step 520, the incident management system 14 sends the identified relevant incidents associated with the received incident to one of the one or more site engineer devices 18(1)-18(n) and resolves the identified relevant incidents based on prior resolutions as documented in the relevant incidents. Further, the exemplary method ends at step 525. In this example, the relevant incidents identified and sent to the site engineer devices 18(1)-18(n) are top K incidents with the highest cosine similarity scores as the related incidents. An example to better illustrate the aforementioned incident management process is that suppose that the organization currently had 4,500 historical incidents (e.g. INC2418245, INC2354532), each with a short incident description, such as "Image recognition users in US-South experiencing failures" and "NLU users in Frankfurt may experience training delays". Among the 4,500 historical incidents, 2,000 were with dependency information such as INC2354532 has the upstream cause of INC2351219 and the downstream effect on INC2355970. For all 4,500 historical incidents, the text encoder engine 405 in one embodiment encodes them into 300-dimensional textual representations using pre-trained word embedding illustrated in step 310 and FIG. 4. Next, the graph encoder engine 410, in one embodiment, encodes the dependency relationships between the 2,000 incidents also into 300-dimensional contextual representations. Then the aligner engine 415 learns the transformation matrix W from the 2,000 incidents with both textual and contextual vector presentations. The aligner engine 415 also converts the 2,500 historical incidents without dependency information into contextual space based on the learnt transformation matrix W. When a new incident comes, the text encoder engine 405 will encodes it into three hundred dimensional textual vectors based on incident description. Then the aligner engine 415 will align the textual representation of the new incident into three hundred-dimensional contextual presentation based on the previously learnt transformation matrix W. The incident retriever engine 605 will next based on the into three hundred-dimensional contextual presentation of the new incident to search for relevant incidents from the 4,500 historical incidents also based on their 300-dimensional contextual representations, using similarity measurement such as cosine similarity. Once the search is complete, the incident retriever engine 605 returns the SREs with the top N related historical incidents, along with their resolutions. Then the SREs can try to resolve the new incident by referencing the resolutions from the retrieved historical ones.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A method comprising:
receiving, by an incident management system, incident data associated with an incident in a computing system from an incident reporting system, wherein the incident data further comprises textual data and contextual data associated with the incident data, wherein the contextual data indicates a dependency relationship of the incident with one or more other incidents;
preparing training data by converting historical textual representations of historical incident data into historical textual vector representations;
training an artificial intelligence model by projecting historical textual embeddings into a vector space as the historical textual vector representations by learning a transformation matrix;
configuring the artificial intelligence model to encode the incident descriptions into vector representations;
converting, by a text encoder engine of the incident management system, the textual data of the received incident data into textual representations using the artificial intelligence model;
aligning, by an aligner engine of the incident management system, the contextual data and the converted textual representations into contextual representations of the received incident data;
converting, by a graph encoder engine of the incident management system with the artificial intelligence model, one or more historical dependency relationships between more than one historical incidents encoded into vector representations of one or more historical contextual representations on a graph embedding space, wherein each historical incident comprises one selected from a group consisting of historical textual data and historical contextual data;
selecting, by an incident retriever engine of the incident management system with the artificial intelligence model, one or more prospective incidents associated with the received incident data from the encoded vector representations of the more than one historical incidents based on contextual representations of the received incident data and the one or more historical contextual representations;
converting, using the artificial intelligence model, one or more prospective incidents into textual representations;
mapping, using the artificial intelligence model, the textual representations for the one or more prospective incidents to the graph embedding space with a linear transformation based on the learnt transformation matrix;
identifying, using the artificial intelligence model, a related incident that is textually similar and contextually relevant to the received incident, and
providing, by the incident management system based on the vector representations encoded by the artificial intelligence model, the identified related incident associated with the received incident data to a site engineer device and resolve the received incident data using prior resolution data present within the identified related incident.

2. The method as set forth in claim 1 further comprising:
obtaining, by the incident management system from one or more site engineer devices, the more than one historical incidents.

3. The method as set forth in claim 2 wherein, the historical textual data and the historical contextual data of the more than one historical incidents are converted in a graphical representation by the graph encoder engine of the incident management system.

4. The method as set forth in claim 1 wherein, the received incident data is converted into a vector representation by the text encoder engine of the incident management system.

5. The method as set forth in claim 1 wherein the textual data comprises textual description of the received incident.

6. The method as set forth in claim 1, wherein the dependency relationship comprises an upstream cause or downstream effect.

7. A non-transitory machine readable medium having stored thereon instructions comprising machine executable code which when executed by at least one machine causes the machine to:
receive, by an incident management system, incident data associated with an incident in a computing system from an incident reporting system, wherein the incident data further comprises textual data and contextual data associated with the incident data, wherein the contextual data indicates a dependency relationship of the incident with one or more other incidents;
prepare training data by converting historical textual representations of the historical incident data into historical textual vector representations;
train an artificial intelligence model projecting historical textual embeddings into a vector space as the historical textual vector representations by learning a transformation matrix;
configure the artificial intelligence model to encode the incident descriptions into vector representations;
convert, by a text encoder engine of the incident management system, the textual data of the received incident data into textual representations using the artificial intelligence model;
align, by an aligner engine of the incident management system, the contextual data and the converted textual representations into contextual representations of the received incident data;
convert, by a graph encoder engine of the incident management system with the artificial intelligence model, one or more historical dependency relationships between more than one historical incidents encoded into vector representations of one or more historical contextual representations on a graph embedding space, wherein each historical incident comprises one selected from a group consisting of historical textual data and historical contextual data;
select, by an incident retriever engine of the incident management system with the artificial intelligence model, one or more prospective incidents associated with the received incident data from the encoded vector representations of the more than one historical incidents based on contextual representations of the received incident data and the one or more historical contextual representations;
convert, using the artificial intelligence model, the one prospective incidents into textual representations;
map, using the artificial intelligence model, the textual representations for the one or more prospective incidents to the graph embedding space with a linear transformation based on the learnt transformation matrix;

identify, using the artificial intelligence model, a related incident that is textually similar and contextually relevant to the received incident; and provide, by the incident management system based on the vector representations encoded by the artificial intelligence model, the identified related incident associated with the received incident data to a site engineer device and resolve the received incident data using prior resolution data present within the identified related incident.

8. The medium as set forth in claim 7 further comprising:
obtain, by the incident management system from one or more site engineer devices, the more than one historical incidents.

9. The medium as set forth in claim 8 further comprising, the historical textual data and the historical contextual data of the more than one historical incidents are converted in a graphical representation by the graph encoder engine of the incident management system.

10. The medium as set forth in claim 7 wherein, the received incident data is converted into a vector representation by the text encoder engine of the incident management system.

11. The medium as set forth in claim 7 wherein the textual data comprises textual description of the received incident.

12. The medium as set forth in claim 7, wherein the dependency relationship comprises an upstream cause or downstream effect.

13. An incident management system, comprising:
a memory comprising programmed instructions stored in the memory; and one or more processors configured to be capable of executing the programmed instructions stored in the memory to:

receive incident data associated with an incident in a computing system from an incident reporting system, wherein the incident data further comprises textual data and contextual data associated with the incident data, wherein the contextual data indicates a dependency relationship of the incident with one or more other incidents, prepare training data by converting historical textual representations of historical incident data into historical textual vector representations, train an artificial intelligence model by projecting historical textual dings into a vector space as the historical textual vector representations by learning a transformation matrix, configure the artificial intelligence model to encode the incident descriptions into vector representations, convert, by a text encoder engine, the textual data of the received incident data into textual representations using the artificial intelligence model, align, by an aligner engine, the contextual data and the converted textual representations into contextual representations of the received incident data, convert, by a graph encoder engine with the artificial intelligence model, one or more historical dependency relationships between more than one historical incidents encoded into vector representations of one or more historical contextual representations on a graph embedding space, wherein each historical incident comprises one of historical textual data and historical contextual data, select, by an incident retriever engine with the artificial intelligence model, one or more prospective incidents associated with the received incident data from the encoded vector representations of the more than one historical incidents based on contextual representations of the received incident data and the one or more historical contextual representations, convert, using the artificial intelligence model, the one or more prospective incidents into textual representations, map, using the artificial intelligence model, the textual representations for the one or more prospective incidents to the graph embedding space with a linear transformation based on the learnt transformation matrix, identify, using the artificial intelligence model, a related incident that is textually similar and contextually relevant to the received incident, and provide, based on the vector representations encoded by the artificial intelligence model, the identified related incident associated with the received incident data to a site engineer device and resolve the received incident data using prior resolution data present within the identified related incident.

14. The system as set forth in claim 13 wherein the one or more processors are further configured to be capable of executing the programmed instructions stored in the memory to:
obtain, by the incident management system from one or more site engineer devices, the more than one historical incidents.

15. The system as set forth in claim 14 wherein the historical textual data and the historical contextual data of the more than one historical incidents are converted in a graphical representation by the graph encoder engine.

16. The system as set forth in claim 13 wherein the received incident data is converted into a vector representation by the text encoder engine.

17. The system as set forth in claim 13 wherein the textual data comprises textual description of the received incident.

18. The system as set forth in claim 13 wherein the received incident data is resolved based on historical resolution data associated with the identified one or more relevant incidents.

19. The system as set forth in claim 13 wherein the one or more processors are further configured to be capable of executing the programmed instructions stored in the memory to generate, by the incident retriever engine, one or more actionable insights by applying natural language processing on the received textual data.

20. The system as set forth in claim 13, wherein the dependency relationship comprises an upstream cause or downstream effect.

* * * * *